United States Patent [19]

Yokoya et al.

[11] Patent Number: 5,175,875
[45] Date of Patent: Dec. 29, 1992

[54] RADIO COMMUNICATION APPARATUS WITH PROGRAMMABLE SIGNAL MODULATION

[75] Inventors: Satoshi Yokoya, Kanagawa; Takayuki Inoue, Tokyo; Nobutaka Takao, Kanagawa; Noboru Someno, Saitama, all of Japan

[73] Assignee: Sony Corporation, Tokyo, Japan

[21] Appl. No.: 502,680

[22] Filed: Apr. 2, 1990

[30] Foreign Application Priority Data

| Apr. 2, 1989 [JP] | Japan | 1-83331 |
| Apr. 2, 1989 [JP] | Japan | 1-83332 |
| Apr. 2, 1989 [JP] | Japan | 1-83333 |

[51] Int. Cl.$^5$ .......................... H04B 1/38; H01Q 11/12
[52] U.S. Cl. ...................................... 455/89; 455/116; 455/127; 379/61
[58] Field of Search .............. 455/36, 89, 90, 116, 455/129, 127, 115; 379/60, 61

[56] References Cited

U.S. PATENT DOCUMENTS

| 4,013,961 | 3/1977 | Colebourn | 455/115 |
| 4,521,912 | 6/1985 | Franke et al. | 455/127 |
| 4,709,404 | 11/1987 | Tamura et al. | 455/127 |
| 4,956,876 | 9/1990 | Koshiishi | 455/89 |
| 4,992,753 | 2/1991 | Jenson et al. | 455/116 |
| 5,033,109 | 7/1991 | Kawano et al. | 455/127 |
| 5,033,111 | 7/1991 | Murai | 455/127 |

Primary Examiner—Reinhard J. Eisenzopf
Assistant Examiner—Andrew Faile
Attorney, Agent, or Firm—Hill, Van Santen, Steadman & Simpson

[57] ABSTRACT

A radio communication apparatus comprising a modulating portion for modulating a carrier with a signal to transmit so as to produce a transmissible signal; a signal transmitting portion for transmitting the transmissible signal; a level adjusting portion for adjusting a level of the signal to transmit or a level of a control signal used for controlling the transmissible signal in accordance with digital control data supplied to the level adjusting portions; a memory for storing digital adjusting data; and a control unit for reading the digital adjusting data from the memory and supplying the level adjusting portion with the digital adjusting data read from the memory or modified digital adjusting data obtained based on the digital adjusting data read from the memory as the digital control data.

19 Claims, 6 Drawing Sheets

RADIO COMMUNICATION APPARATUS WITH PROGRAMMABLE SIGNAL MODULATION

BACKGROUND OF THE INVENTION

1. Field of the Invention

The present invention relates generally to radio communication apparatus, such as a mobile radio telephone apparatus. More particularly, the invention relates to a radio communication apparatus operative to control a transmissible signal, which is produced by modulating a carrier signal with a communications signal, so as to have an appropriate degree of modulation thereof or an appropriate output level thereof and then to transmit the transmissible signal controlled in its degree of modulation or its output level.

2. Description of the Prior Art

In a cellular mobile telephone system, communications between a mobile telephone apparatus such as a mobile radio telephone apparatus mounted in an automobile and an ordinary telephone subscriber, or between automobile mounted mobile telephone apparatus, are carried out through a particular local base station. A radio communication apparatus constituting the mobile radio telephone apparatus used in the public mobile telephone system is operative to transmit not only a voice information signal but also various control tone signals and control data. In transmissions of the voice information signal, control tone signals and control data, transmissible signals are produced by, for example, frequency-modulating a common carrier with the voice information signal, control tone signals and signals representing the control data (control data signals), respectively, and each of the transmissible signals thus produced is transmitted. In such transmissions, the transmissible signals formed based on the voice information signal, control tone signals and control data signals are provided with respective degrees of modulation which have been standardized to be different from each other. Further, each of the transmissible signals is transmitted through a power amplifier to have a predetermined output level which has been also standardized.

Accordingly, the radio communication apparatus which constitutes the mobile radio telephone apparatus used in the public mobile telephone system is required to produce various transmissible signals, each of which is obtained by frequency-modulating a predetermined carrier with one of the voice information signal, control tone signals and control data signals, and provided with degree of modulation which meets standard requirements, and to control each of the transmissible signals to have an output level which also meets standard requirements, before transmission of each of the transmissible signals.

The degree of modulation of the transmissible signal is determined by adjusting the level of the voice information signal, control tone signal, or control data signal with which the carrier is frequency-modulated to produce the transmissible signal. The output level of the transmissible signal is determined by adjusting a level of a detected output obtained from a level detector. The arrangement includes a power amplifier for amplifying the power of the transmissible signal and a level controller provided for controlling the power amplifier in view of a comparison output obtained by comparing the level of the detection output from the level detector with a reference level.

In the previously proposed radio communication apparatus, adjustment in the levels of each of the voice information signal, control tone signals, and control data signals is carried out by adjusting a variable resistor disposed on a signal path for each of the voice information signal, control tone signals, and control data signals. Adjustment in the output levels of the detected output from the level detector, provided for detecting the level of each of the transmissible signals amplified by the power amplifier, is carried out for determining the output level of each of the transmissible signals also in the production process of the apparatus by adjusting a resistance value of a variable resistance connected to an output end of the level detector.

The above-mentioned adjustment in level of each of the voice information signal, control tone signals, and control data signals and adjustment in level of the detected output from the level detector bring about a problem that complicates work resulting in relatively large working hours required to adjust correctly the adjustable resistors for determining the degree of modulation of each of the transmissible signals and the output level of each of the transmissible signals.

Further, in the case where the resistance value of the variable resistance disposed on the signal path for each of the voice information signal, control tone signals, and control data signals and the resistance value of the variable resistance connected to the output of the level detector accompanying the power amplifier is adjusted, to set the degree of modulation and output level of each of the transmissible signals before a printed circuit board on which the variable resistors are mounted is installed in the apparatus, the degree of modulation or of each of the transmissible signals can be subtly varied so as to have undesirable deviations when the printed circuit board on which the variable resistors are mounted is installed in the apparatus. If the degree of modulation or the output level of each of the transmissible signals is undesirably varied when the printed circuit board is installed in the apparatus, the resistance value of each of the variable resistors must be adjusted again so as to correct the undesirable variation after the printed circuit board is installed in the apparatus. This result is disadvantageous in that production efficiency of the apparatus is decreased, because adjustments to the resistors must be made twice.

SUMMARY OF THE INVENTION

The present invention provides a radio communication apparatus in which a transmissible signal is produced by modulating a carrier with a communications signal and controlled to have an appropriate degree of modulation thereof or an appropriate output level thereof in advance of being transmitted, which avoids the aforementioned problems and disadvantages.

Further, the invention provides a radio communication apparatus in which a transmissible signal is produced by modulating a carrier with a communications signal and controlled to have an appropriate degree of modulation thereof or an appropriate output level thereof in advance of being transmitted, which is operative to adjust the level of the communications signal so as to provide the transmissible signal with the appropriate degree of modulation or to control a power amplifier through which the transmissible signal is transmitted so as to provide the transmissible signal with the appropriate output level.

To these ends, in an embodiment, there is provided a radio communication apparatus comprising a modulating portion for modulating a carrier with a signal to transmit so as to produce a transmissible signal; a signal transmitting portion for transmitting the transmissible signal; a level adjusting portion for adjusting, in accordance with digital control data supplied thereto, a level of the signal to transmit or a level of a control signal used for controlling the transmissible signal a memory for storing digital adjusting data; and a control unit for reading the digital adjusting data from the memory and supplying the level adjusting portion with the digital adjusting data read from the memory or modified digital adjusting data obtained based on the digital adjusting data read from the memory as the digital control data.

In a radio communication apparatus thus constituted, the signal to transmit with which the carrier is modulated to produce the transmissible signal, is adjusted in level in accordance with the digital adjusting data which are read from the memory or modified digital adjusting data which are obtained based on the digital adjusting data read from the memory, so that the transmissible signal is controlled to have an appropriate degree of modulation. Alternatively, the control signal which is used for controlling the transmissible signal is adjusted in level in accordance with the digital adjusting data which are read from the memory or modified digital adjusting data which are obtained based on the digital adjusting data read from the memory so that the transmissible signal is controlled to have an appropriate output level. With such adjustment of the signal to transmit or the control signal used for controlling the transmissible signal, the degree of modulation or the output level of the transmissible signal is adjusted until appropriate.

The memory may be arranged so as to be attached to a memory connecting portion provided in the apparatus after the digital adjusting data has been previously stored in the memory or may be arranged so as to be mounted on a memory connecting portion provided in the apparatus and connected to an interface connecting portion provided on the apparatus so that the digital adjusting data rae supplied from outside of the apparatus through the interface connecting portion to the memory connecting portion to be stored in the memory.

These and other features and advantages of the present invention will become apparent from the following detailed description of the presently preferred embodiments and the accompanying drawings.

DESCRIPTION OF THE PREFERRED EMBODIMENTS

Figure 1:
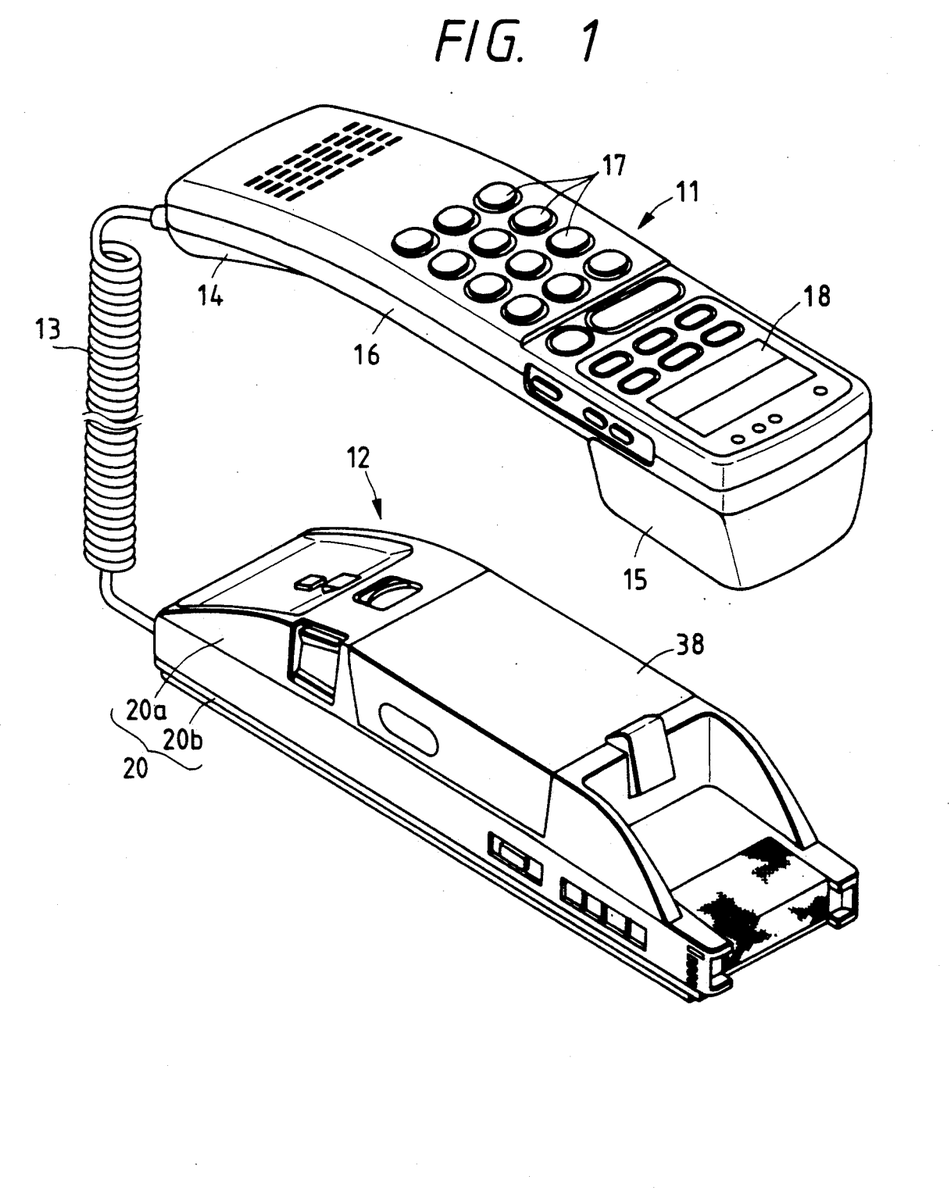
FIG. 1 is a perspective view of a telephone radio communication apparatus illustrating the handset and cradle.

FIG. 1 illustrates a first embodiment of a radio communication apparatus according to the present invention, which constitutes a mobile radio telephone apparatus.

Referring to FIG. 1, the first embodiment comprises a handset 11 and a cradle 12 to which the handset 11 is connected through an elastic cable 13. The handset 11 has a voice input portion 14 containing a microphone, a voice output portion 15 containing a speaker, and a grip portion 16 which interconnects the voice input portion 14 and the voice output portion 15 and on which a plurality of push-button switches 17 for dialing and a display portion 18 for displaying telephone numbers are provided. The cradle 12 is provided with a case 20 which is formed with upper and lower half bodies 20a and 20b to contain a communications unit therein.

Figure 2:
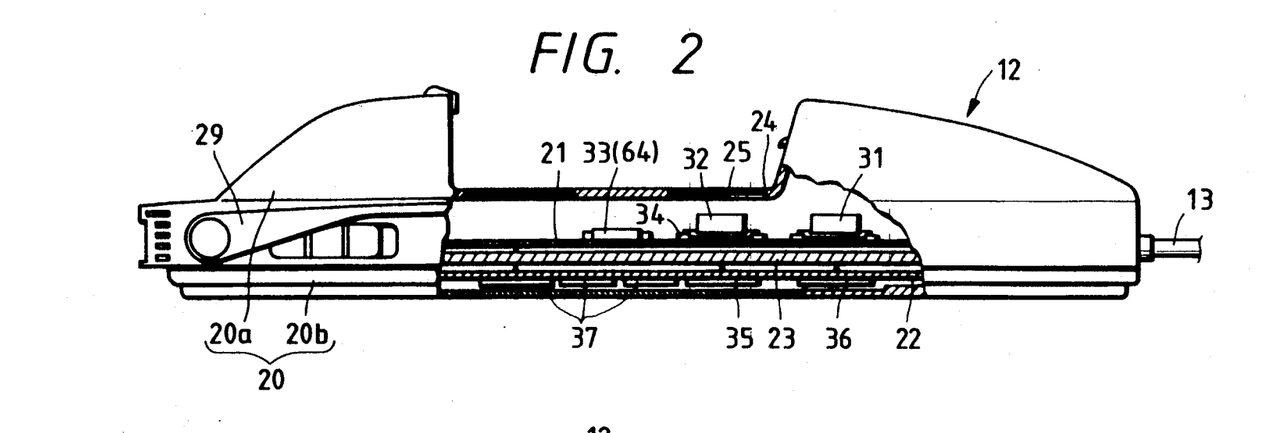
FIG. 2 is a side view of the cradle of the apparatus of FIG. 1 with a portion broken away.

As illustrated in FIG. 2, in the case 20 of the cradle 12, first and second circuit board 21 and 22 are attached to a chassis 23 such that the chassis 23 is positioned between the first and second circuit boards 21 and 22. The chassis 23 is provided in the form of an aluminum alloy die-casting so that heat generated by circuit elements and parts mounted on the chassis is efficiently radiated through the chassis.

Figure 3:
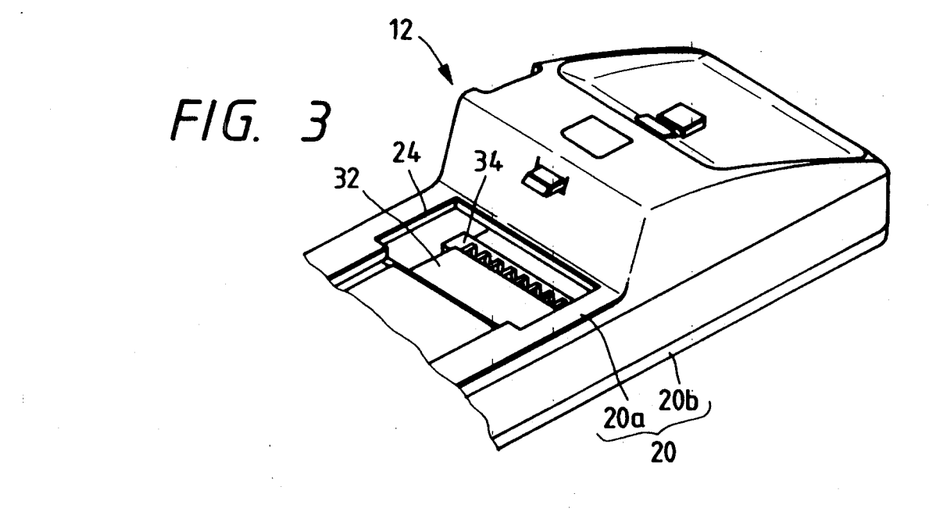
FIG. 3 is a partial perspective view of the cradle of the apparatus of FIG. 1.

Various circuit elements including a control unit 31; a memory connector 34, to which a memory device 32, a read only memory (ROM), is connected; a level attenuating device 33; and a programmable attenuator 64 are mounted on the first circuit board 21. As illustrated in FIG. 3, the memory connector 34 is positioned below an opening 24 which is formed on a portion of the upper half body 20a of the case 20, above the first circuit board 21, so that the memory device 32 can be easily attached to or detached from the memory connector 34 through the opening 24. The opening 24 is selectively closed by a sliding shutter 25 (not illustrated in FIG. 2). Other circuit elements including a frequency modulator 35, an output level controlling device 36, and elements 37 are mounted on the second circuit board 22.

Further, as illustrated in FIG. 1, a battery pack 38 containing batteries is attached to a central portion of the upper half body 20a of the case 20 so as to be detachable therefrom and, as illustrated in FIG. 2, an antenna 29 is attached to a lower portion of the upper half body 20a of the case 20 in such a manner as to be capable of being raised.

Figure 4:
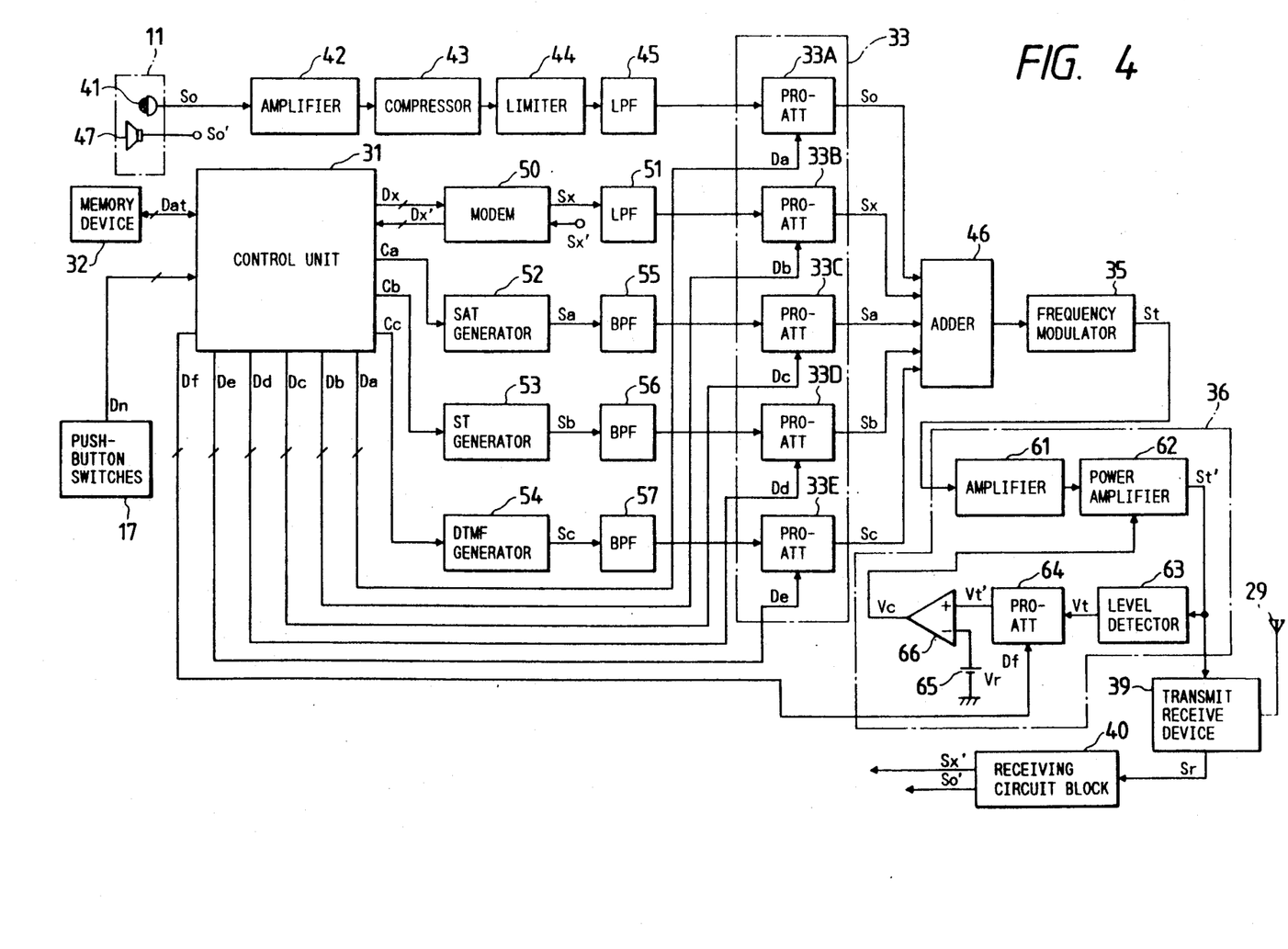
FIG. 4 is a block diagram of a communication circuit that can be used in the apparatus of FIG. 1.

A communications circuit comprising the circuit elements and parts mounted on the first and second circuit boards 21 and 22 described above in the first embodiment shown in FIG. 1 is illustrated by a block diagram in FIG. 4.

Referring to FIG. 4, a speech signal So from a microphone 41 contained in the handset 11 is amplified by an amplifier 42, compressed in level by a compressor 43, limited in level by a limiter 44, and then supplied to a low pass filter (LPF) 45. The speech signal So, having passed through the low pass filter 45, is supplied to a programmable attenuator (PROATT) 33A, which forms a part of the level attenuating device 33. The programmable attenuator 33A is operative to adjust the level of the speech signal So by reducing the level to comply with digital adjusting data Da applied thereto from the control unit 31. The speech signal So, after being subjected to level adjustment in the programmable attenuator 33A, is supplied to an adder 46.

Digital control data Dx from the control unit 31 is converted into an audio signal Sx by a modem 50 which selectively functions as a modulator and a demodulator, as the occasion demands. The audio signal Sx obtained from the modem 50 is supplied to a low pass filter 51. The audio signal Sx having passed through the low pass filter 51 is supplied to a programmable attenuator 33B constituting a second part of the level attenuating device 33. The programmable attenuator 33B is operative to adjust the level of the audio signal Sx by reducing the level in view of digital adjusting data Db applied thereto from control unit 31. The audio signal Sx, after being subjected to level adjustment in the programmable attenuator 33B, is supplied to the adder 46.

Tone control signals Ca, Cb and Cc which are sent from the control unit 31 according to circumstances, are supplied to an SAT generator 52, an ST generator 53, and a DTMF (digital tone multi-frequency) generator 54, respectively. The SAT generator 52 to which the tone control signal Ca is supplied is operative to generate a SAT (supervisory audio tone) signal Sa in response to the tone control signal Ca. The SAT signal Sa from the SAT generator 52 is supplied through a band pass filter (BPF) 55 to a programmable attenuator 33C constituting another part of the level attenuating device 33 The programmable attenuator 33C is operative to adjust the level of the SAT signal Sa by reducing the level in view of digital adjusting data Dc applied thereto from the control unit 31. The SAT signal Sa, after being subjected to level adjustment in the programmable attenuator 33C, is supplied to the adder 46.

The ST generator 53 to which the tone control signal Cb is supplied is operative to generate an ST (signaling tone) signal Sb in response to the tone control signal Cb. The ST signal Sb from the ST generator 53 is supplied through a band pass filter 56 to a programmable attenuator 33D constituting another part of the level attenuating device 33. The programmable attenuator 33D is operative to adjust the level of the ST signal Sb by reducing the level in view of digital adjusting data Dd applied thereto from the control unit 31. The ST signal Sb, after being subjected to level adjustment in the programmable attenuator 33D, is supplied to the adder 46.

The tone control signal Cc is formed to correspond to digital numerical data Dn which are obtained from the push-button switches 17 and supplied to the control unit 31. The DTMF generator 54, to which the tone control signal Cc is supplied, is operative to generate a DTMF signal Sc, which is a kind of tone signal having a frequency corresponding to one of the push-button switches 17, in response to the tone control signal Cc. The DTMF signal Sc from the DTMF generator 54 is supplied through a band pass filter 57 to a programmable attenuator 33E constituting another part of the level attenuating device 33. The programmable attenuator 33E is operative to adjust the level of the DTMF signal Sc by reducing the level in view of digital adjusting data De applied thereto from the control unit 31. The DTMF signal Sc, after being subjected to level adjustment in the programmable attenuator 33E, is supplied to the adder 46.

The speech signal So, audio signal Sx, SAT signal Sa, and ST signal Sb or DTMF signal Sc, each subjected to the level adjustment in the level attenuating device 3S, are obtained from the adder 46 and supplied to the frequency modulator 35. The frequency modulator 35 is operative to produce a transmissible signal St by frequency-modulating a carrier having a predetermined frequency with each of the speech signal So, audio signal Sx, SAT signal Sa and ST signal Sb or DTMF signal Sc obtained from the adder 46. The transmissible signal St is formed so as to be provided with a degree of modulation that is determined in accordance with the level adjustments of the speech signal So, audio signal Sx, SAT signal Sa, ST signal Sb and DTMF signal Sc carried out in the programmable attenuators 33A, 33B, 33C, 33D, and 33E, respectively. The transmissible signal St is supplied to the output level controlling device 36 from the frequency modulator 35.

In the output level controlling device 36, the transmissible signal St is supplied through an amplifier 61 to a power amplifier 62. The power amplifier 62 is controlled by a gain control circuit which comprises a level detector 63 for detecting a level of a power-amplified transmissible signal St' obtained from the power amplifier 62, a programmable attenuator 64 to which a detection output Vt obtained from the level detector 63 is applied, and a level comparator 66 for comparing a level of a level-adjusted detection output Vt' obtained from the programmable attenuator 64 with a level of a reference voltage Vr from a reference voltage source 65. The level comparator 66 produces a comparison output Vc and supplies same to a control terminal of the power amplifier 62.

In the power amplifier 62, the transmissible signal St is power-amplified in response to the comparison output Vc to produce the power-amplified transmissible signal St' Therefore, the level of the power-amplified transmissible signal St' is varied in response to the comparison output Vc.

The power-amplified transmissible signal St' obtained from the power amplifier 62 is supplied through a transmit-receive device 39 to an antenna 29 to be transmitted therefrom.

The programmable attenuator 64 constituting a part of the gain control circuit connected with the power amplifier 62 is operative to adjust the level of the detection output Vt obtained from the level detector 63 by reducing the level in such a manner as to comply with digital adjusting data Df from the control unit 31 to produce the level-adjusted detection output Vt', so that the comparison output Vc obtained from the level comparator 66 is varied in accordance with variations in the level of the level-adjusted detection output Vt'. Accordingly, the gain of the power amplifier 62 which is controlled in response to the comparison output Vc is substantially controlled in accordance with the digital adjusting data Df from the control unit 31. This results in the level of the power-amplified transmissible signal St' obtained from the power amplifier 62 being adjusted in accordance with the digital adjusting data Df.

A received signal Sr which is detected by the antenna 29 during a receiving operation is supplied through the transmit-receive device 39 to a receiving circuit block 40 which produces 'a received speech signal So' and a received audio signal Sx'. The received speech signal So' obtained from the receiving circuit block 40 is supplied to a speaker 47 contained in the handset 11 and thereby sound is obtained from the speaker 47. Further, the received audio signal Sx' obtained from the receiving circuit block 40 is also supplied to the modem 50 to be converted into received digital control data Dx' and the received digital control data Dx' obtained from the modem 50 is supplied to the control unit 31.

In an apparatus having the communications circuit discussed above and illustrated in FIG. 4, and in a step of a production process wherein the apparatus is subjected to adjustments and checks of various portions thereof after having been assembled, the sliding shutter 25 provided on the case 20 of the cradle 12 is positioned to open the opening 24 formed on the case 20, as illustrated in FIG. 3, and the memory device 32 is attached to the memory connector 34 through the opening 24. In the memory device 32, composite digital adjusting data Dat including the digital adjusting data Da, Db, Dc, Dd, De, and Df are stored. The digital adjusting data Da, Db, Dc, Dd, and De are selected to cause the programmable attenuators 33A, 33B, 33C, 33D, and 33E to adjust the levels of the speech signal So from the low pass filter 45, audio signal Sx from the low pass filter 51, SAT signal Sa from the band pass filter 55, ST signal Sb from the band pass filter 56, and DTMF signal Sc from the band pass filter 57, respectively, so that the transmissible signal St obtained from the frequency modulator 35 is provided with an appropriate degree of modulation which meets standard requirements. Further, the digital adjusting data Df are selected to cause the programmable attenuator 64 in the output level attenuating device 36 to adjust the level of the detection output Vt obtained from the level detector 63 so that the power-amplified transmissible signal St' obtained from the power amplifier 62 is provided with an appropriate level which meets standard requirements.

After the memory device 32 is attached to the memory connector 34, on the occasion of transmission of the power-amplified transmissible signal St', the control unit 31 is operative to read the composite digital adjusting data Dat from the memory device 32 and to supply the programmable attenuators 33A, 33B, 33C, 33D, and 33E with the digital adjusting data Da, Db, Dc, Dd, and De, respectively, and the programmable attenuator 64 with the digital adjusting data Df included in the composite digital adjusting data Dat. With the operations of the control unit 31 thus conducted, the programmable attenuators 33A, 33B, 33C, 33D, and 33E operate to adjust the levels of the speech signal So, audio signal Sx, SAT signal Sa, ST signal Sb, and DTMF signal Sc in accordance with the digital adjusting data Da, Db, Dc, Dd, and De, respectively, and the programmable attenuator 64 operates to adjust the level of the detection output Vt obtained from the level detector 63 in accordance with the digital adjusting data Df, as mentioned above. As a result, the power-amplified transmissible signal St' which is formed based on the speech signal So, audio signal Sx, SAT signal Sa, ST signal Sb, and DTMF signal Sc is transmitted with the appropriate degree of modulation and the appropriate amplification level.

Figure 5:
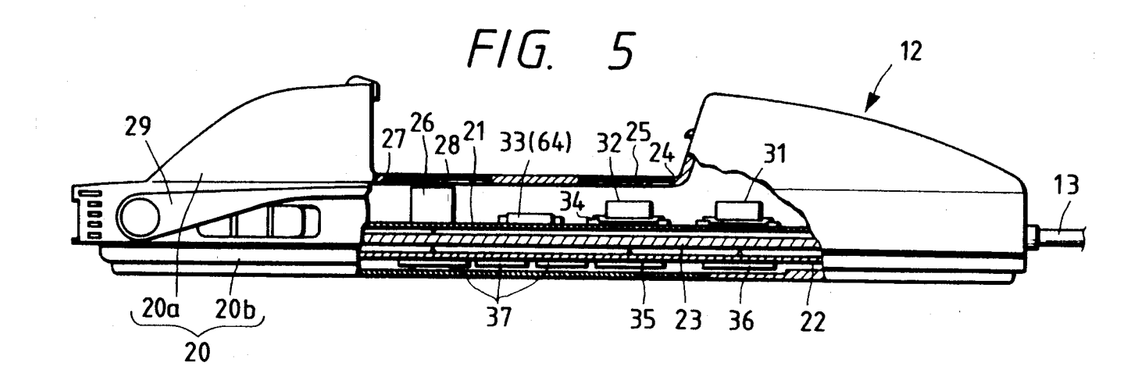
FIG. 5 is a side view of a cradle of a second telephone radio communication apparatus with a portion broken away.
Figure 6:
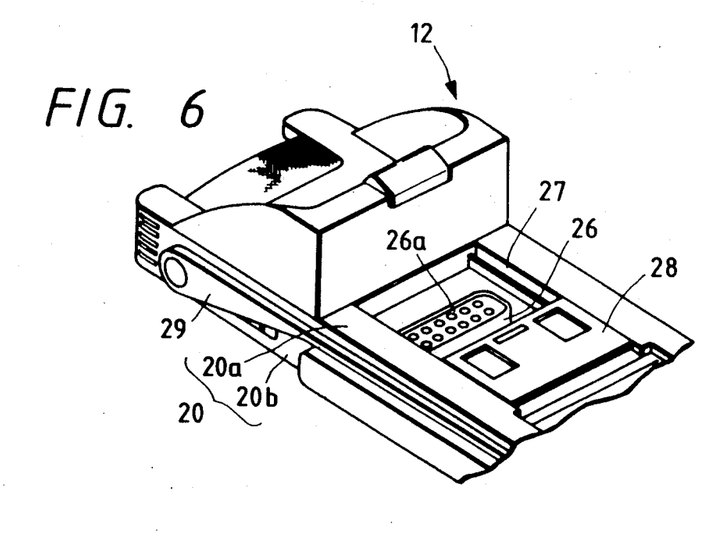
FIG. 6 is a partial perspective view of the cradle of FIG. 5.

FIGS. 5 and 6 illustrate a portion of another radio communication apparatus, which also constitutes a mobile radio telephone apparatus. In large part, the illustrated portion of the apparatus of FIGS. 5 and 6 is constituted in the same manner as the corresponding portion of the apparatus of FIGS. 2 and 3. in FIGS. 5 and 6, portions, devices, elements, and parts corresponding to those of FIGS. 2 and 3 are marked with the same reference numerals. Accordingly, further descriptions will be omitted.

In the apparatus of FIGS. 5 and 6, in the case 20 of the cradle 12, mounted on the first circuit board 21, is an interface connector 26 for making a connection with an external data generator, a control unit 31, a memory connector 34 to which a memory device 32 is connected, a level attenuating device 33, and a programmable attenuator 64. As illustrated in FIG. 6, the interface connector 26 is positioned below an opening 27, which is formed on a portion of an upper half body 20a of the case above the first circuit board 21, so as to direct a connecting face 26a thereof toward the opening 27. The opening 27 is selectively closed by a sliding shutter 28 which is provided on
the upper half body 20a of the case 20. The memory device 32 is arranged so as to be able to store data therein repeatedly.

Figure 7:
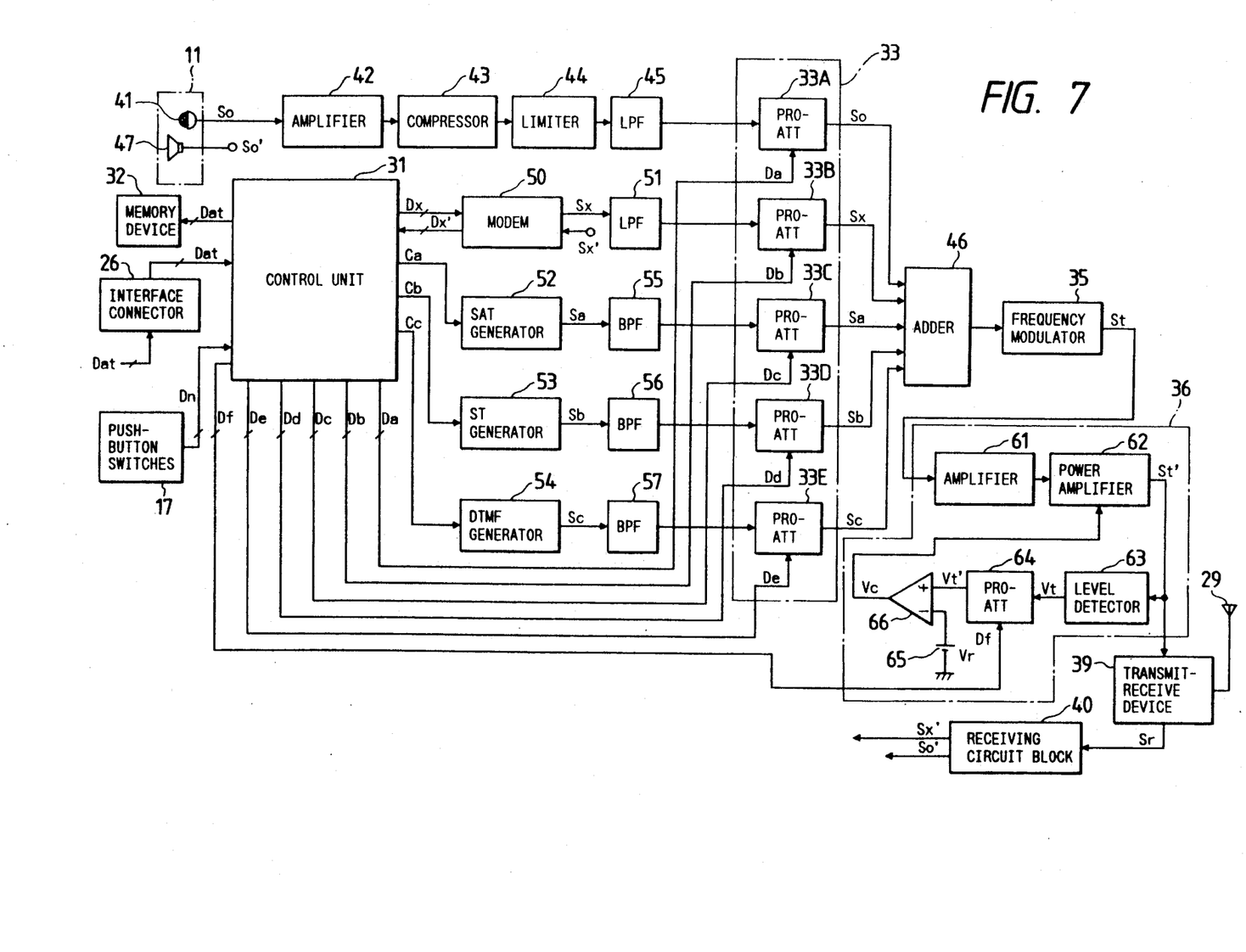
FIG. 7 is a block diagram of a communications circuit that can be used in the apparatus of FIGS. 5 and 6.

A communications circuit comprising the circuit elements and devices mounted on the first circuit board 21 and various circuit elements and devices mounted on a second circuit board 22 as illustrated in FIGS. 5 and 6, is illustrated in block diagram form in FIG. 7. A large portion of the block diagram of FIG. 7 is constituted in the same manner as the block diagram of FIG. 4. Accordingly, in FIG. 7, devices, blocks and signals corresponding to those of FIG. 4 are marked with the same reference numerals and further descriptions thereof will be omitted.

Referring to FIG. 7, the interface connector 26 is connected to the control unit 31 so that composite digital adjusting data Dat which are generated by the external data generator can be supplied through the interface connector 26 to the control unit 31.

In the apparatus using the communications circuit of FIG. 7, in a step of a production process wherein the apparatus is subjected to adjustments and checks of various portions thereof after having been assembled, the sliding shutter 28 provided on the case 20 of the cradle 12 is positioned to open the opening 27 formed on the case 20 (as illustrated in FIG. 6) and the external data generator which generates the composite digital adjusting data Dat is connected to the interface connector 26 through the opening 27. Then, as illustrated in FIG. 7, the composite digital adjusting data Dat from the external data generator are supplied through the interface connector 26 to the control unit 31.

The composite digital adjusting data Dat are formed to include digital adjusting data Da, Db, Dc, Dd, and De are selected to cause programmable attenuators 33A, 33B, 33C, 33D, and 33E to adjust the levels of speech signal So from a low pass filter 45, audio signal Sx from a low pass filter 51, SAT signal Sa from a band pass filter 55, ST signal Sb from a band pass filter 56, and DTMF signal Sc from a band pass filter 57, so that a transmissible signal St obtained from a frequency modulator 35 is provided with an appropriate degree of modulation which meets standard requirements. Further, the digital adjusting data Df are selected to cause the programmable attenuator 64 in an output level attenuating device 36 to adjust the level of a detection output Vt obtained from a level detector 63 so that a power-amplified transmissible signal St' obtained from a power amplifier 62 is provided with an appropriate level which meets standard requirements.

The control unit 31 to which the composite digital adjusting data Dat are supplied is operative to supply the memory device 32 with the composite digital adjusting data Dat so that the composite digital adjusting data Dat are stored in the memory device 32.

After the composite digital adjusting data Dat are stored in the memory device 32. When the power-amplified transmissible signal St' is transmitted, the control Unit 31 is operative to read the composite digital adjusting data Dat from the memory device 32 and to supply the programmable attenuators 33A, 33B, 33C, 33D, and 33E with the digital adjusting data Da, Db, Dc, Dd, and De, respectively, and the programmable attenuator 64 with the digital adjusting data Df in the same manner as is done in the memory device 32 employed in the circuit described above with reference to FIG. 4. Consequently, the power-amplified transmissible signal St' which is formed based on the speech signal So, audio signal Sx, SAT signal Sa, ST signal Sb, and DTMF signal Sc is transmitted with the appropriate degree of modulation and the appropriate level.

Figure 8:
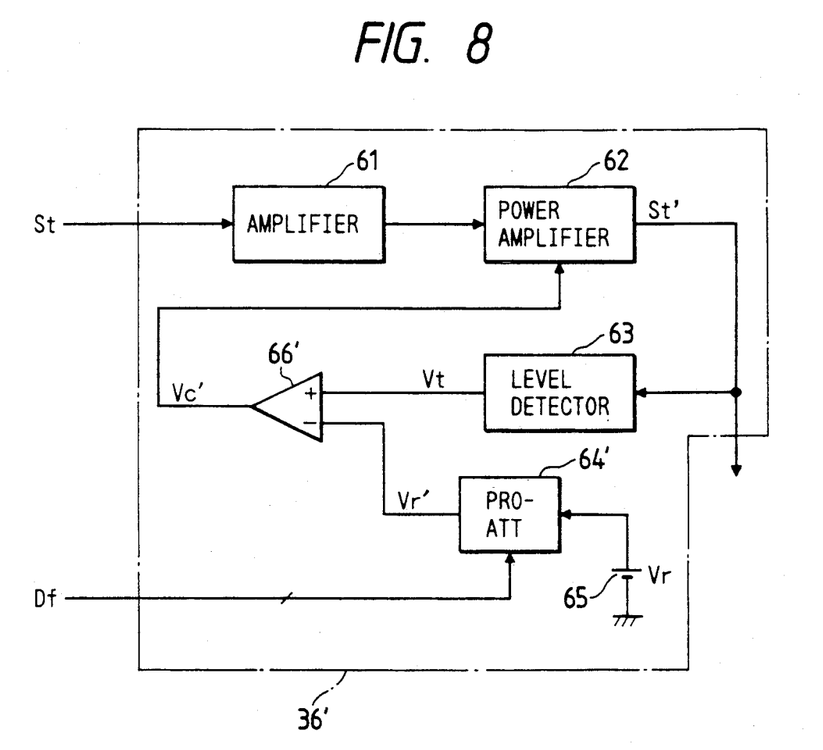
FIG. 8 is a block diagram of an output level adjusting circuit that can be used in both of the apparatus illustrated in FIGS. 1 to 4 and in FIGS. 5 to 7, respectively.

FIG. 8 illustrates an output level attenuating device 36' which can be used in place of the output level attenuating device 36 employed in each of the communications circuit configurations of FIGS. 4 and 7. In FIG. 8, devices, blocks and signals corresponding to those of each of FIGS. 4 and 7 are marked with the same references.

In the output level attenuating device 36' illustrated in FIG. 8, a transmissible signal St is supplied through an amplifier 61 to a power amplifier 62. The power amplifier 62 is controlled by a gain control circuit which comprises a level detector 63 for detecting a level of a power-amplified transmissible signal St', a programmable attenuator 64' to which a reference voltage Vr obtained from a reference voltage source 65 is applied, and a level comparator 66' for comparing a level of a detection output Vt obtained from the level detector 63 with a level of a level-reduced reference voltage Vr' obtained from the programmable attenuator 64; to produce a comparison output Vc' and for supplying a control terminal of the power amplifier 62 with the comparison output Vc'.

In the power amplifier 62 having the control terminal to which the comparison output Vc' is supplied, the transmissible signal St is power-amplified with gain controlled in response to the comparison output Vc' to produce the power-amplified transmissible signal St'. Therefore, the level of the power-amplified transmissible signal St' is varied in response to the comparison output Vc'.

The programmable attenuator 64' is operative to adjust the level of the reference voltage Vr obtained from the reference voltage source 65 by reducing the same in such a manner as to comply with the digital adjusting data Df from the control unit 31 to produce the level-reduced reference voltage Vr', so that the comparison output Vc' obtained from the level comparator 66' is varied in accordance with variations in the level of the level-reduced reference voltage Vr'. Accordingly, the gain of the power amplifier 62 which is controlled in response to the comparison output Vc' is substantially controlled in accordance with the digital adjusting data Df from the control unit 31. The result is that the level of the power-amplified transmissible signal St' obtained from the power amplifier 62 is adjusted in accordance with the digital adjusting data Df.

Although the digital adjusting data Da, Db, Dc, Dd, De, and Df which are included in the composite digital adjusting data Dat read from the memory device 32 are directly supplied to the programmable attenuators 33A, 33B, 33C, 33D, 33E and 64, respectively, by the control unit 31 in each of the above described embodiments, it is to be understood that the present invention is not limited thereto, and that it is possible to cause the control unit 31 to produce modified digital adjusting data based on the digital adjusting data Da, Db, Dc, Dd, De, and Df read from the memory device 32 and to supply respectively the programmable attenuators 33A, 33B, 33C, 33D, 33E, and 64 with the modified digital adjusting data so that the power-amplified transmissible signal St' is transmitted with the appropriate degree of modulation and the appropriate level.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

What is claimed is:

1. A radio communication apparatus comprising:
   at least one signal generator that generates a signal to transmit;
   modulating means for modulating a carrier with said signal to transmit so as to produce a transmissible signal;
   signal transmitting means operatively coupled for transmitting said transmissible signal;
   means for controlling said transmissible signal interconnecting said modulating means and said signal transmitting means, said means for controlling said transmissible signal having a control signal input by means of which amplification of said transmissible signal is controlled;
   level adjusting means for adjusting independently of each other, in accordance with digital control data supplied thereto, a level of said signal to transmit and a level of a control signal used for controlling said means for controlling said transmissible signal, said level adjusting means comprising a first controllable signal attenuator coupled between said signal generator and said modulating means and a second controllable signal attenuator operatively coupled in a feedback loop to said control signal input of said means for controlling said transmissible signal;
   memory means for storing digital adjusting data; and
   control means operatively coupled for reading the digital adjusting data from said memory means and supplying independently of each other said adjusting first and second controllable attenuators with said digital control data which is derived from said digital adjusting data.

2. The radio communication apparatus of claim 1, further comprising a plurality of signal generator and a plurality of first controllable attenuators, each signal generator having a first controllable attenuator associated therewith.

3. The radio communication apparatus of claim 1, wherein said level adjusting means is operative to reduce the level of said signal to transmit in accordance with said digital control data so that the transmissible signal obtained from said modulating means is provided with a desired degree of modulation.

4. The radio communication apparatus of claim 3, wherein said first and second controllable attenuators comprise programmable attenuators.

5. The radio communication apparatus of claim 1, wherein said means for controlling said transmissible signal comprises a power amplifier for amplifying the transmissible signal obtained from said modulating means and said signal transmitting means comprises an antenna to which the transmissible signal amplified by said power amplifier is applied, and said level adjusting means is operative to supply said power amplifier with said control signal and to reduce the level of the control signal in accordance with said digital control data.

6. The radio communication apparatus of claim 5, wherein said level adjusting means further comprises:
   a level detector for detecting a level of the transmissible signal amplified by said power amplifier;
   an output from said level detector being coupled to said second controllable attenuator, said second controllable attenuator being operative to reduce the level of said output of said level detector in accordance with said digital control data;
   a reference voltage source for producing a reference voltage; and
   a level comparator operatively coupled for comparing the level of an output of said second controllable attenuator and the level of said reference voltage and producing said control signal supplied to said power amplifier based on a result of said comparison.

7. The radio communication apparatus of claim 5, wherein said level adjusting means further comprises:
   a level detector for detecting a level of the transmissible signal amplified by said power amplifier;
   a reference voltage source for producing a reference voltage;
   said reference voltage and said digital control data being supplied to said second attenuator, said second attenuator being programmable and operative to reduce the level of said reference voltage in accordance with said digital control data; and
   a level comparator for comparing the level of said reference voltage with a level of a detection signal output of said level detector and producing said control signal based on a result of the comparison.

8. The radio communication apparatus of claim 1 further comprising memory connecting means to which said memory means is detachably attached so as to be connected to said control means.

9. The radio communication apparatus of claim 1 further comprising interface connecting means connected to said control means by means of which said control means can be connected to an external data generator.

10. The radio communication apparatus of claim 9, wherein said digital adjusting data are supplied form the external data generator through said interface connecting means to said control means when the external data generator is connected to said interface connecting means and then further supplied form said control means to said memory means to be stored in said memory means.

11. A radio communication apparatus comprising:
   at least one signal generator operative to generate signal to transmit;
   modulating means for modulating a carrier with said signals to transmit so as to produce a transmissible signal;
   signal transmitting means for transmitting said transmissible signal;
   level adjusting means for adjusting independently of each other levels of said signals to transmit in accordance with respective digital control data supplied thereto thereby to modulate the transmissible signal;
   memory means for storing digital adjusting data; and
   control means for reading the digital adjusting data from said memory means and supplying said level adjusting means with said digital control data based on the digital adjusting data read from said memory means.

12. The radio communication apparatus of claim 11, wherein said level adjusting means comprises a plurality of programmable attenuators to which said signals to transmit are supplied, said programmable attenuators being supplied with said digital control data and operative to reduce the levels of said signals to transmit in accordance with said control data.

13. The radio communication apparatus of claim 11 further comprising memory connecting means to which said memory means is removeably attached so a to be connected to said control means.

14. The radio communication apparatus of claim 13, wherein said memory means is attached to said memory connecting means after said digital adjusting data have been previously stored in said memory means.

15. The radio communication apparatus according to claim 11 further comprising interface connecting means connected to said control means by means of which said control means can be connected to an external data generator.

16. The radio communication apparatus of claim 15, wherein said digital adjusting data are supplied from the external data generator through said interface connecting means to said control means when the external data generator is connected to said interface connecting means and then further supplied from said control means to said memory means to be stored in said memory means.

17. A radio communication apparatus comprising:
   at least one signal generator operative to generate a plurality of signal to transmit;
   modulating means for modulating a carrier with said plurality of signals to transmit so as to produce a transmissible signal;
   signal transmitting means for transmitting said transmissible signal, comprising a controllable power amplifier with a control signal input and an antenna coupled to an output of the power amplifier;
   level adjusting means for adjusting a level of a control signal used for controlling said power amplifier in accordance with digital control data supplied thereto, said adjusting means comprising a controllable attenuator operatively coupled to attenuate a feedback signal extracted from said output of said power amplifier, and a comparator having one input to which said attenuated feedback signal is coupled and an output which is coupled to said control signal input of said power amplifier;
   memory means for storing digital adjusting data; and
   control means for reading the digital adjusting data from said memory means and supplying said level adjusting means with said digital control data derived from said digital adjusting data read from said memory means.

18. A radio communication apparatus comprising:
   modulating means for modulating a carrier with a signal to transmit so as to produce a transmissible signal;
   signal transmitting means for transmitting said transmissible signal;

level adjusting means for adjusting. in accordance with digital control data supplied thereto, a level of said signal to transmit;

memory means for storing digital adjusting data;

control means for reading the digital adjusting data from said memory means and supplying said level adjusting means with said digital control data based on the digital adjusting data read from said memory means;

an enclosure having an opening which is selectively closable;

memory connecting means disposed in said enclosure and electrically coupled to said control means, said memory means detachably connected to said control means by said memory connecting means; and said memory means being positioned substantially in registry with said opening so as to be accessible from outside said enclosure.

19. A radio communication apparatus comprising:

modulating means for modulating a carrier with a signal to transmit so as to produce a transmissible signal;

signal transmitting means for transmitting said transmissible signal;

level adjusting means for adjusting. in accordance with digital control data supplied thereto, a level of a control signal used for controlling said transmissible signal;

memory means for storing digital adjusting data;

control means for reading the digital adjusting data from said memory means and supplying said level adjusting means with said digital control data based on the digital adjusting data read from said memory means;

an enclosure having an opening which is selectively closeable;

memory connecting means disposed in the enclosure and coupled to said control means, said memory means detachably connected by said memory connecting means to said control means; and said memory connecting means being positioned substantially in registry with said opening so as to be accessible from outside said enclosure.

* * * * *